Dec. 11, 1951  G. G. EMANUELSSON  2,578,467
DEVICE FOR GENERATION AND MODULATION OF IMPULSES
Filed May 24, 1949
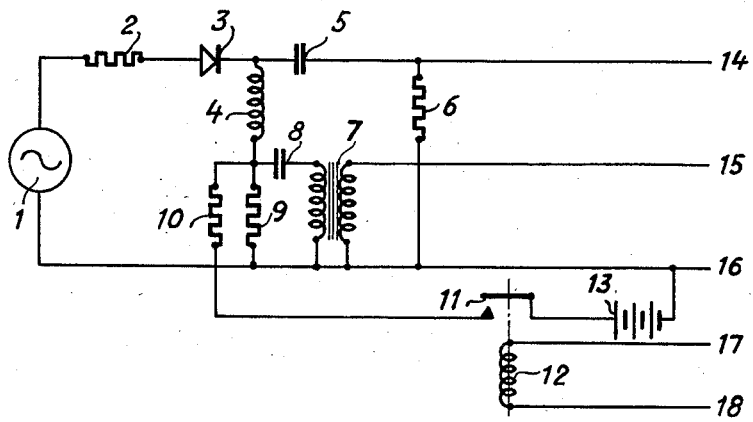
Fig.1
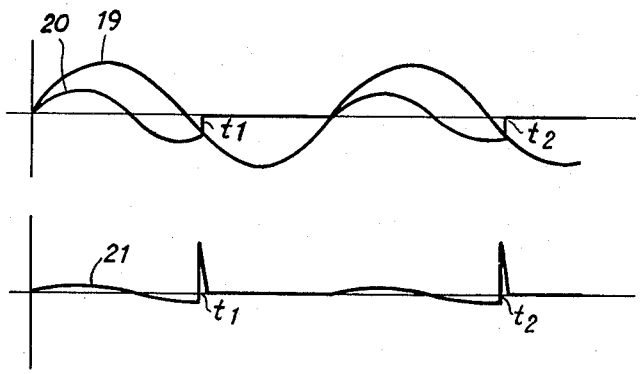
Fig.2
Fig.3
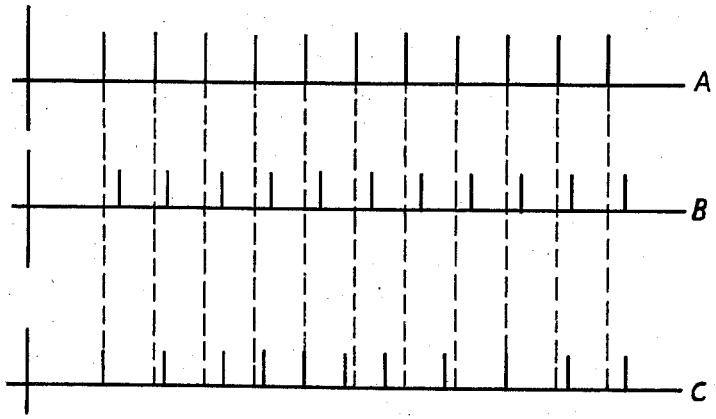
Fig.4
Inventor
G. G. Emanuelsson Patented Dec. 11, 1951

2,578,467

UNITED STATES PATENT OFFICE 2,578,467

DEVICE FOR GENERATION AND
MODULATION OF IMPULSES

Gunnar Gideon Emanuelsson, Stockholm, Sweden, assignor to Telefonaktiebolaget L M Ericsson, Stockholm, Sweden, a company of Sweden Application May 24, 1949, Serial No. 95,098
In Sweden October 6, 1948

4 Claims. (Cl. 332—9)

1

This invention relates to transmitting circuits and more particularly to devices for generation and modulation of impulses.

It is previously known to produce a voltage, which has sharply marked surges in its time variation, by means of a device consisting of a series connection of a voltage source, a resistor, a rectifier and a reactor. These surges appear with a frequency which is the same as the frequency of the voltage source. It is also previously known to transform such a surge voltage into a series of impulses by means of a device consisting of a condenser and a resistor connected in series. A condition precedent for this is that the condenser-resistor circuit has a comparatively small time constant.

The object of the present invention is to provide a device for generating a periodic voltage in surges which become impulses and including means for modulating the surges and impulses.

In order to make the invention more clearly understood and readily carried into effect the same will hereinafter be more fully described with reference to the accompanying drawing.

Fig. 1 is a diagram showing a device for generation and modulation of impulses according to the invention.

Fig. 2 is a graphical diagram of a sine wave voltage and a surge voltage which is produced by said sine voltage.

Fig. 3 is a graphical diagram of a series of impulses which are produced by said surge voltage.

Fig. 4 is a graphical diagram of impulses transmitted by a device according to the invention.

The device can be said to consist of an input circuit and an output circuit. The input circuit contains a series connection of a generator 1 that emits a voltage with a comparatively high frequency, a resistor 2, a rectifier 3, an inductor 4 and a resistor 9. A voltage of relatively low frequency can be supplied to the input circuit parallel with the resistor 9, either with a transformer 7 and a coupling condenser 8 or—providing that the voltage consists of a direct voltage—with a series connection of a resistor 10, a relay 11 and a battery 13. The relay 11 closes the series connection when a relay winding 12 is energized. The output circuit contains a series connection of a condenser 5 and a resistor 6, to the ends of which the output terminals 14 and 16 of the device are coupled. The output circuit is connected across the inductor 4 and the resistor 9.

The function of the device is as follows: If the generator 1 is assumed to give a periodic voltage with a certain repetition frequency, a voltage is

2 received between the ends of the inductor 4, said voltage in its time variation having sharply marked surges dependent on the non-linear characteristics of the rectifier 3 and the phase shifting effect of the inductor 4 on the current-voltage course in the input circuit. In Fig. 2 the curve 19 represents the voltage at the output terminals of the generator 1 and the curve 20 represents the voltage over the inductor 4. As can be seen from the latter curve there arises one surge in every period of the generator voltage. The time of two such surges are indicated with $t_1$ and $t_2$, respectively. The surge voltage thus generated in the input circuit is by means of the output circuit 5—6 transformed into a series of impulses, which then are derived from the ends of the resistor 6. In Fig. 3 the impulse voltage over the resistor 6 corresponding to the surge voltage in Fig. 2 is shown.

The time for the appearance of a surge and consequently also for that of an impulse caused by the surge is dependent on the frequency of the voltage fed into the input circuit. By supplying a voltage of low frequency to the input circuit with the aid of the transformer 7 and the condenser 8 it is possible to modulate the original impulse series. In Fig. 4 A represents an original, non-modulated impulse series, B a displaced impulse series, and C on the other hand a modulated one. With an arrangement like this it is thus possible to obtain an impulse series, the repetition frequency of which is the same as the frequency of the generator 1, but which impulses are more or less displaced in respect to time, owing to the modulation voltage supplied from the transformer 7 or the battery 13. If the modulated impulse series shall represent the modulation voltage the frequency of the generator 1 ought to be at least double the frequency of the modulation voltage. If for example the device should be used for voice transmission the frequency of the generator 1 ought to be at least 8000 cycles p. s.

The circuit 9—10—11—13 makes it possible to displace every impulse in the original impulse series a certain equal distance with respect to time. As above stated in Fig. 4 B represents such a displaced impulse series. If one wishes to transmit a ringing current of low frequency and this shall be fed into the input circuit through the transformer 7 it is necessary on one hand to provide a transformer, which is expensive to construct owing to the great frequency band that is to be transmitted; on the other hand it is necessary to furnish the receiver arrangement with special filters and amplifiers to receive a sufficient signal effect. By feeding the ringing current to the connections 17 and 18 instead, which causes the relay 11 to function, a displacement of the whole impulse series is obtained, owing to which it is not necessary to take the mentioned steps, neither on the sending nor the receiving side of the transmitting system.

I claim:

1. A device for the generation and modulation of impulses, including a circuit for producing a voltage with sharply marked surges, said circuit including in series connection a first voltage source, which generates a voltage with relatively high frequency, a first resistor, a rectifier, an inductor, and a second resistor, a second voltage source connected in parallel with said latter resistor, which generates a modulating voltage, and a branch circuit for transforming said surges to impulses, said branch circuit including a condenser and a resistor so connected to the first circuit that at least the inductor is common to the circuit and the branch.

2. A device for the generation and modulation of impulses including a generator for generating a voltage of relatively high frequency, a resistor and a rectifier in series in one line from the generator, and inductor and a second resistor across the lines from the generator, a transformer having its secondary connected at one side through a condenser intermediate the inductor and the second resistor and connected at the other side to the other line from the generator, and its primary connected at one side to the other line from the generator and at the other side to an input line.

3. A device for the generation and modulation of impulses including a generator for generating a voltage of relatively high frequency, a resistor and a rectifier in series in one line from the generator, an inductor and a second resistor across the lines from the generator, a relay, a primary circuit for said relay, and a modulating circuit connected to the other side of the line from the generator and intermediate the inductor and the second resistor, said modulating circuit including a second source of voltage, the contacts of said relay, and a third resistor.

4. A device for the generation and modulation of impulses including a generator for generating a voltage of relatively low frequency, a resistor, rectifier and capacitor in series in one line from the generator, an inductor and a second resistor connected in series in the said line intermediate the rectifier and the capacitor and to the other line from the generator, a third resistor connected across the lines from the generator on the other side of the capacitor, a transformer having its secondary connected at one side intermediate the inductor and the second resistor and connected at the other side to the other line from the generator, and its primary connected at one side to the said other line from the generator and at the other side to an input line.

GUNNAR GIDEON EMANUELSSON.

REFERENCES CITED

The following references are of record in the file of this patent:

UNITED STATES PATENTS

| Number | Name | Date |
| --- | --- | --- |
| 2,284,401 | Manley et al. | May 26, 1942 |
| 2,284,402 | Manley et al. | May 26, 1942 |
| 2,311,796 | Wrathal | Feb. 23, 1943 |
| 2,476,959 | Chatterjea et al. | July 26, 1949 |